United States Patent [19]
Kim et al.

[11] Patent Number: 5,864,005
[45] Date of Patent: Jan. 26, 1999

[54] PROCESS FOR THE PREPARATION OF COPOLYESTER RESIN HAVING LOW ACETALDEHYDE CONTENT

[75] Inventors: Sang-Il Kim, Suwon-al; Bum-Sang Kim, Seoul, both of Rep. of Korea

[73] Assignee: SKC, Limited, Kyungki-do, Rep. of Korea

[21] Appl. No.: 944,305

[22] Filed: Oct. 6, 1997

[30]     Foreign Application Priority Data

Oct. 7, 1996 [KR] Rep. of Korea .................. 9644461

[51] Int. Cl.$^6$ .................................................. C08G 3/00

[52] U.S. Cl. ............................................................. 528/176

[58] Field of Search ..................... 528/176, 193, 528/194

[56]         References Cited

PUBLICATIONS

Encyclopedia of Polymer Science and Technology, vol. 11, pp. 62–128, (1988).

*Primary Examiner*—Terressa Mosley
*Attorney, Agent, or Firm*—Anderson, Kill & Olick, P.C.

[57]         ABSTRACT

A copolyester resin having excellent physical properties and a low acetaldehyde content is produced by: polycondensing a mixture of terephthalic acid and isophthalic acid with a glycol in the presence of a phosphate compound to prepare a copolyester prepolymer having an intrinsic viscosity of more than 0.5 dl/g; subjecting the copolyester prepolymer to a first heat-treatment to obtain a pre-crystallized resin; and subjecting the pre-crystallized resin to a second heat-treatment, to obtain a copolyester resin having an intrinsic viscosity of 0.62 to 0.80 dl/g and a melting point of 190° to 240° C.

2 Claims, No Drawings

PROCESS FOR THE PREPARATION OF COPOLYESTER RESIN HAVING LOW ACETALDEHYDE CONTENT

FIELD OF THE INVENTION

The present invention relates to a process for the preparation of a copolyester resin having a reduced acetaldehyde content and good physical properties.

BACKGROUND OF THE INVENTION

In general, polyesters such as polyethylene terephthalates (PET) possess good mechanical, thermal, chemical and physical properties. Therefore, they have been widely used in preparing fibers, films, food and beverage containers, industrial mold products and others. Polyester films have recently been employed in laminating the interior of metallic food containers and the laminating process is carried out using adhesives, avoiding the conventional processes which use environmentally harmful organic solvents.

However, such laminating process is expensive mainly because the use of an adhesive is required. Also the adhesive may sometimes induce sanitation problems. Further, a laminated polyester film has poor post-processing properties, i.e., the polyester film is brittle and tears easily.

In order to impart better thermal adhesion and post-processing properties to a laminating polyester film, the use of various copolyester resins have been attempted.

However, copolyester resins prepared by conventional methods generally contain acetaldehyde at a level of more than 2.5 ppm, and the acetaldehyde content increases to an unacceptably high level of about 5 ppm when the copolyester resins are extruded and stretched to form biaxially oriented copolyester films.

Acetaldehyde, a material which is harmful to human, must not be present in a laminated copolyester film of a metallic food container at a level exceeding 3.5 ppm.

SUMMARY OF THE INVENTION

It is, therefore, an object of the present invention to provide a process for preparing a copolyester resin having a reduced content of acetaldehyde as well as good physical properties.

In accordance with an aspect of the present invention, there is provided a process for preparing a copolyeater resin which comprises:

(a) polycondensing a mixture of terephthalic acid and isophthalic acid with a glycol in the presence of a phosphate compound in an amount ranging from 0.005 to 0.2 parts by weight per 100 parts by weight of the copolyester resin to prepare a copolyester prepolymer having 5 to 30% by weight of the ethylene terephthalate repeating unit and 70 to 95% by weight of the ethylene isophthalate repeating unit and having an intrinsic viscosity of more than 0.5 dl/g;

(b) subjecting the copolyester prepolymer to a first heat-treatment to obtain a pre-crystallized resin; and (c) subjecting the pre-crystallized resin to a second heat-treatment to obtain a copolyester resin having an intrinsic viscosity of 0.62 to 0.80 dl/g and a melting point of 190 to 240° C., the second heat-treatment being carried out in three stages, the initial, middle and last stages, under the condition represented by formulas (1) to (6):

$$T_m-70<T_1<T_m-35 \tag{1}$$

$$T_m-40<T_2<T_m-15 \tag{2}$$

$$T_m-65<T_3<T_m-35 \tag{3}$$

$$1\times([IV]-[IV_0])<t_1/1000<3\times([IV]-[IV_0]) \tag{4}$$

$$2\times([IV]-[IV_0])<t_2/1000<4\times([IV]-[IV_0]) \tag{5}$$

$$2\times([IV]-[IV_0])<t_3/1000<3\times([IV]-[IV_0]) \tag{6}$$

wherein:

$T_m$ represents the melting point(°C.) of the copolyester resin;

$T_1$, $T_2$ and $T_3$ represent the temperatures(° C.) of the initial, middle and last stages, respectively;

$t_1$, $t_2$ and $t_3$ represent the time(min.) for the initial, middle and last stages, respectively;

$[IV_0]$ represents the intrinsic viscosity(dl/g) of the prepolymer; and $[IV]$ represents the intrinsic viscosity(dl/g) of the copolyester resin.

DETAILED DESCRIPTION OF THE INVENTION

In accordance with the present invention, there is provided a high-strength copolyester resin having a reduced acetaldehyde content and good thermal adhesiveness to metal, by way of controlling the heat-treatment temperature and time of a thermal solid phase polymerization process.

A copolyester resin suitable for use in the present invention may be prepared from a mixture of terephthalic and isophthalic acid, or a mixture of dialkyl esters thereof, and a glycol.

Preferred dialkyl esters of terephthalic and isophthalic acid are dimethyl terephthalate and dimethyl isophthalate. Exemplary glycols are ethylene glycol, trimethylene glycol, tetramethylene glycol, pentamethylene glycol, hexamethylene glycol and hexylene glycol. Among these, ethylene glycol is most preferred.

The copolyester resin of the present invention comprises 70 to 95%, preferably 82 to 93% by weight of the ethylene terephthalate repeating unit and 5 to 30%, preferably 7 to 18% by weight of the ethylene isophthalate repeating unit. It the content of the ethylene isophthalate repeating unit is less than 5% by weight, the copolyester film prepared therefrom has poor thermal adhesiveness to a metal substrate and poor post-processing properties due to the occurrence of extensive crystallization. Whereas, if the ethylene isophthalate content exceeds 30% by weight, the copolyester has low mechanical strength and it is not capable of maintaining the flavor of the food packaged therewith.

In accordance with the inventive process for the preparation of a copolyester resin, a mixture of terephthalic acid and isophthalic acid is mixed with a glycol in specified amounts and the resulting mixture is polycondensed by a conventional method until the resulting copolyester prepolymer attains an intrinsic viscosity of 0.5 dl/g or more. When the intrinsic viscosity of the prepolymer is less than 0.5 dl/g, the viscosity of the final copolyester resin is not controllable.

The polycondensation reaction for obtaining the prepolymer of the present invention is carried out in the presence of a phosphate compound as a thermal stabilizer. The phosphate compound prevents thermal breakdown of the resulting resin and inhibits the formation of an inactive complex of the metallic compound employed as a catalyst in the polymerization reaction.

Representatives of the phosphate compound which may be employed in the present invention include triphenyl phosphate, tricresyl phosphate, trimethyl phosphate, triethyl phosphate, tributyl phosphate, trixyrenyl phosphate, xyrenyldiphenyl phosphate, cresyldiphenyl phosphate and a mixture thereof.

The phosphate compound may be employed in an amount ranging from 0.005 to 0.2 parts by weight per 100 parts by weight of the copolyester resin. If the amount of the phosphate compound is less than 0.005 part, the resulting polymer has poor thermal resistance, and accordingly, a large amount of acetaldehyde is generated at the solid phase polymerization and film formation steps. Beyond the phosphate content of 0.2 parts, the thermal resistance of the polymer no longer increases, while the polymer becomes low in strength and poor in hue.

Thereafter, the resulting prepolymer is subjected to a first heat-treatment to obtain a pre-crystallized resin. The first heat-treatment is conducted at a temperature ranging from 80° to 120° C. for a period sufficient for the degree of crystallization of the resin to reach 30% or more.

The pre-crystallized resin is then subjected to a second heat-treatment which is conducted in three stages, i.e., initial, middle and last stages to perform a thermal solid phase polymerization. The present invention is characterized in that the temperature and time of said second heat-treatment are controlled to satisfy the condition represented by formulas (1) to (6):

$$T_m-70<T_1<T_m-35 \quad (1)$$

$$T_m-40<T_2<T_m-15 \quad (2)$$

$$T_m-65<T_3<T_m-35 \quad (3)$$

$$1\times([IV]-[IV_0])<t_1/1000<3\times([IV]-[IV_0]) \quad (4)$$

$$2\times([IV]-[IV_0])<t_2/1000<4\times([IV]-[IV_0]) \quad (5)$$

$$2\times([IV]-[IV_0])<t_3/1000<3\times([IV]-[IV_0]) \quad (6)$$

wherein:
$T_m$ represents the melting point(°C.) of the copolyester resin;
$T_1$, $T_2$ and $T_3$ represent the temperatures(°C.) at the initial, middle and last stages, respectively;
$t_1$, $t_2$ and $t_3$ represent the time(min.) for the initial, middle and last stages, respectively;
$[IV_0]$ represents the intrinsic viscosity(dl/g) of the prepolymer; and
$[IV]$ represents the intrinsic viscosity(dl/g) of the copolyester resin.

That is, the second heat-treatment step of the present invention is carried out in three stages at a temperature ranging from $T_m$–70° C. to $T_m$–15° C., end the time for the second heat-treatment step varies depending on the difference between the intrinsic viscosity of the prepolymer and that of the desired copolyester resin. The second heat-treatment process may be conducted under a reduced pressure of about 2 to 380 mmHg.

The copolyester resin of the present invention has an intrinsic viscosity of 0.62 to 0.80 dl/g as measured at 35° C. at a concentration of 0.3 g in 25 ml of o-chlorophenol. If the viscosity of the copolyester resin is lower than 0.620 dl/g, the crystallization of the resin proceeds rapidly and the molecular weight of the resin becomes low. A film prepared from the resulting resin tends to be brittle and the acetaldehyde content of the resin becomes high. Further, if the viscosity of the copolyester resin exceeds 0.80 dl/g, the molecular weight of the resin becomes high and it is difficult to obtain a uniform film therefrom.

The copolyester resin of the present invention has a melting point of 190° to 240° C., preferably 200° to 235° C. and it is particularly suitable for the purpose of coating the interior of metallic food containers, and the acetaldehyde content thereof is low, at a level not exceeding 1.2 ppm.

The copolyester resin of the present invention may comprise other known additives, e.g., polycondensation catalyst, dispersant, static agent, anti-blocking agent and the like, in amounts which would not deteriorate the effectiveness of the present invention.

Further, in order to impart good winding and optical properties to the film, the copolyester resin may comprise additional inert particles. Inert particles selected from silicon dioxide, calcium carbonate, titanium dioxide, talc, alumina and magnesium oxide may be employed in amounts which would not affect the effectiveness of the present invention. The inert particles may be added to the polyester resin at any time before terminating the polycondensation of the starting materials.

A copolyester film may be obtained by melt-extruding the copolyester resin prepared in accordance with the present invention through a die to form a cast sheet and stretching the sheet.

The copolyester film thus prepared contains acetaldehyde in an amount of 2.5 ppm or less and has a good thermal adhesion property. It is therefore particularly useful for coating a metal substrate, e.g., for laminating the interior of metallic food containers.

The following Examples are intended to illustrate the present invention more specifically, without limiting the scope of the invention.

In Examples and Comparative Examples, the properties of the resin and the film were evaluated in accordance with the following methods.

1. Melting Point

The melting point (°C.) of a resin was determined with a differential scanning calorimeter (Perkin Elmer, DSC-7). A resin sample was melted at 300° C. and cooled to solidify it, and then the melting point of the resin was measured while elevating the temperature at a rate of 20° C./min.

2. Acetaldehyde Content

The acetaldehyde content of a resin or a film was measured using a gas chromatograph (Manufacturer: Shimadzu, Japan, Model No.: GC/9A).

3. Breaking Strength

The breaking strength of a film was determined by measuring the tensile strength thereof in accordance with ASTM D882 using UTM4206 (Instron, USA).

EXAMPLE 1

A mixture of 88 parts by weight of terephthalic acid and 12 parts by weight of isophthalic acid (as an acid component) was mixed with ethylene glycol in an equivalent ratio of 1:2 and thereto were added 0.11 part by weight of silicon dioxide having an average diameter of 1.4 μm and 0.02 parts by weight of triethyl phosphate. The resulting mixture was polycondensed in the presence of antimony trioxide as a polycondensation catalyst to obtain a solidified copolyester prepolymer having an intrinsic viscosity of 0.58 dl/g.

The prepolymer thus obtained was pre-crystallized at 100° C. for 180 minutes. In order to carry out a solid phase polymerization, the resulting polymer was then subjected to a three-stage heat-treatment procedure: 200 minutes at 170° C. (initial stage), 300 minutes at 192° C. (middle stage) and 250 minutes at 171° C. (last stage), under 380 mmHg of nitrogen to obtain a copolyester resin having an intrinsic viscosity of 0.699 dl/g, a melting point of 221° C. and an acetaldehyde content of 0.9 ppm.

The copolyester resin thus obtained was melt-extruded using an extruder and T-die, and stretched in the longitudinal and transverse directions to obtain a biaxially oriented copolyester film having a uniform thickness of 25 μm, a breaking strength of 19.6 kg$_f$/mm$^2$ and an acetaldehyde content of 1.8 ppm.

EXAMPLE 2 to 11

The procedure of Example 1 was repeated except that the amounts of isophthalic acid and phosphate compound, as well as the conditions for the second heat-treatment step, were varied as shown in Table I. The properties of the film were measured and, as the results in Table I show, the films prepared in accordance with the present invention exhibit excellent properties.

Comparative Examples 1 to 11

The procedure of Example 1 was repeated except that the amounts of isophthalic acid and phosphate compound, as well as the conditions for the second heat-treatment step, were varied as shown in Table II. The properties of the film were measured, as the results in Table II show, the films prepared using procedures outside the scope of the present invention exhibit poor properties.

TABLE I

| | | Conditions for Prepolymer Preparation | | | Conditions for Second Heat-Treatment | | | | | | Physical properties of resin | | | Physical properties of film | |
|---|---|---|---|---|---|---|---|---|---|---|---|---|---|---|---|
| | | | | | Initial Stage | | Middle Stage | | Last Stage | | | | | | |
| unit | | [IPA] parts by weight | [TEP] | [IV$_0$] dl/g | $T_1$ °C. | $t_3$ min | $T_2$ °C. | $t_2$ min | $T_3$ °C. | $t_3$ min | [IV] dl/g | $T_m$ °C. | [AA] ppm | S. kg$_f$/mm$^2$ | [AA] ppm |
| Ex. | 1 | 12 | 0.02 | 0.580 | 170 | 200 | 192 | 300 | 170 | 250 | 0.699 | 221 | 0.9 | 19.6 | 1.8 |
| | 2 | 9 | 0.02 | 0.590 | 175 | 230 | 200 | 300 | 180 | 250 | 0.705 | 226 | 0.9 | 21.1 | 1.7 |
| | 3 | 15 | 0.03 | 0.582 | 165 | 260 | 190 | 340 | 165 | 280 | 0.710 | 218 | 0.8 | 18.7 | 2.0 |
| | 4 | 10 | 0.015 | 0.581 | 170 | 240 | 195 | 310 | 170 | 260 | 0.700 | 222 | 1.0 | 20.7 | 2.3 |
| | 5 | 11 | 0.02 | 0.578 | 165 | 240 | 190 | 310 | 170 | 260 | 0.697 | 221 | 1.0 | 20.6 | 2.2 |
| | 6 | 11 | 0.02 | 0.584 | 170 | 220 | 195 | 290 | 170 | 240 | 0.695 | 222 | 1.0 | 20.1 | 1.9 |
| | 7 | 11 | 0.02 | 0.594 | 180 | 195 | 190 | 280 | 170 | 230 | 0.701 | 221 | 0.9 | 20.5 | 1.9 |
| | 8 | 11 | 0.02 | 0.592 | 170 | 220 | 200 | 260 | 170 | 240 | 0.703 | 222 | 0.9 | 19.9 | 1.8 |
| | 9 | 11 | 0.02 | 0.579 | 170 | 260 | 195 | 345 | 170 | 290 | 0.711 | 222 | 0.8 | 19.1 | 1.8 |
| | 10 | 11 | 0.02 | 0.587 | 170 | 270 | 195 | 350 | 165 | 310 | 0.722 | 223 | 0.8 | 20.8 | 1.7 |
| | 11 | 11 | 0.02 | 0.582 | 165 | 220 | 190 | 285 | 150 | 190 | 0.692 | 220 | 1.0 | 19.5 | 2.1 |

IPA: Isophthalic acid
TEP: Triethylene phosphate
[IV$_0$]: Intrinsic Viscosity of prepolymer
[IV]: Intrinsic Viscosity of resin
[AA]: Acetaldehyde content
S.: Breaking Strength

TABLE II

| | | Conditions for Prepolymer Preparation | | | Conditions for Second Heat-Treatment | | | | | | Physical properties of resin | | | Physical properties of film | |
|---|---|---|---|---|---|---|---|---|---|---|---|---|---|---|---|
| | | | | | Initial Stage | | Middle Stage | | Last Stage | | | | | | |
| unit | | [IPA] parts by weight | [TEP] | [IV$_0$] dl/g | $T_1$ °C. | $t_3$ min | $T_2$ °C. | $t_2$ min | $T_3$ °C. | $t_3$ min | [IV] dl/g | $T_m$ °C. | [AA] ppm | S. kg$_f$/mm$^2$ | [AA] ppm |
| Comp. Ex. | 1 | 50 | 0.02 | 0.585 | 155 | 200 | 185 | 300 | 155 | 250 | 0.659 | 196 | 1.5 | 14.2 | 3.2 |
| | 2 | 12 | 0.001 | 0.579 | 170 | 200 | 192 | 300 | 170 | 250 | 0.105 | 221 | 1.4 | 19.8 | 3.0 |
| | 3 | 12 | 0.02 | 0.580 | 120 | 200 | 190 | 310 | 170 | 260 | 0.680 | 223 | 1.4 | 19.4 | 3.1 |
| | 4 | 12 | 0.02 | 0.580 | 160 | 60 | 190 | 310 | 170 | 260 | 0.690 | 222 | 1.7 | 18.9 | 3.5 |
| | 5 | 11 | 0.02 | 0.580 | 170 | 240 | 140 | 300 | 170 | 260 | 0.675 | 220 | 1.9 | 19.2 | 4.0 |
| | 6 | 11 | 0.02 | 0.580 | 170 | 240 | 190 | 120 | 170 | 260 | 0.690 | 221 | 1.9 | 19.0 | 4.0 |
| | 7 | 11 | 0.02 | 0.580 | 170 | 240 | 190 | 310 | 120 | 260 | 0.700 | 221 | 1.8 | 19.4 | 3.5 |
| | 8 | 11 | 0.02 | 0.580 | 170 | 240 | 190 | 310 | 170 | 70 | 0.690 | 220 | 2.0 | 18.9 | 3.9 |
| | 9 | 11 | 0.02 | 0.580 | 170 | 240 | 140 | 140 | 170 | 260 | 0.680 | 220 | 2.0 | 19.1 | 4.2 |
| | 10 | 11 | 0.02 | 0.580 | 120 | 120 | 140 | 120 | 120 | 120 | 0.610 | 220 | 2.2 | 18.6 | 4.5 |
| | 11 | 11 | 0.02 | 0.580 | 170 | 450 | 190 | 600 | 170 | 450 | 0.680 | 223 | 0.6 | 19.1 | 3.5 |

IPA: Isophthalic acid
TEP: Triethylene phosphate
[IV$_0$]: Intrinsic Viscosity of prepolymer
[IV]: Intrinsic Viscosity of resin
[AA]: Acetaldehyde content
S.: Breaking Strength As can be seen from Examples and Comparative Examples, the copolyester resin and film prepared by way of controlling the temperature and the time of the solid phase polymerization in accordance with the present invention has a reduced acetaldehyde content as well as good physical properties.

The polyester film prepared from the inventive process is particularly useful in laminating the interior of a metallic food container.

While the invention has been described with respect to the specific embodiments, it should be recognized that various modifications and changes may be made by those skilled in the art to the invention which also fall within the scope of the invention as defined by the appended claims.

We claim:

1. A process for preparing a copolyester resin which comprises:

(a) polycondensing a mixture of terephthalic acid and isophthalic acid with a glycol in the presence of a phosphate compound in an amount ranging from 0.005 to 0.2 parts by weight per 100 parts by weight of the copolyester resin to prepare a copolyester prepolymer having 5 to 30% by weight of the ethylene terephthalate repeating unit and 70 to 95% by weight of the ethylene isophthalate repeating unit and having an intrinsic viscosity of more than 0.5 dl/g as measured at 35° C. at a concentration of 0.3 g in 25 ml of o-chlorophenol;

(b) subjecting the copolyester prepolymer to a first heat-treatment to obtain a pre-crystallized resin; and (c) subjecting the pre-crystallized resin to a second heat-treatment to obtain a copolyester resin having an intrinsic viscosity of 0.62 to 0.80 dl/g and a melting point of 190° to 240° C., the second heat-treatment being carried out in three stages, the initial, middle and last stages, under the condition represented by formulas (1) to (6):

$$T_m - 70 < T_1 < T_m - 35 \tag{1}$$

$$T_m - 40 < T_2 < T_m - 15 \tag{2}$$

$$T_m - 65 < T_3 < T_m - 35 \tag{3}$$

$$1 \times ([IV] - [IV_0]) < t_1/1000 < 3 \times ([IV] - [IV_0]) \tag{4}$$

$$2 \times ([IV] - [IV_0]) < t_2/1000 < 4 \times ([IV] - [IV_0]) \tag{5}$$

$$2 \times ([IV] - [IV_0]) < t_3/1000 < 3 \times ([IV] - [IV_0]) \tag{6}$$

wherein:

$T_m$ represents the melting point (°C.) of the copolyester resin;

$T_1$, $T_2$ and $T_3$ represent the temperatures(°C.) of the initial, middle and last stages, respectively;

$t_1$, and $t_3$ represent the time(min.) for the initial, middle and last stages, respectively; $[IV_0]$ represent the intrinsic viscosity(dl/g) of the prepolymer; and $[IV]$ represents the intrinsic of the copolyester resin.

2. The process of claim 1 wherein the copolyester resin contains acetaldehyde in an amount not exceeding 1.2 ppm.

* * * * *

UNITED STATES PATENT AND TRADEMARK OFFICE

CERTIFICATE OF CORRECTION

PATENT NO.   : 5,864,005
DATED        : January 26, 1999
INVENTOR(S)  : Sang-Il Kim, et al It is certified that error appears in the above-identified patent and that said Letters Patent is hereby corrected as shown below:

On the title page, Item

[30]   Foreign Application Priority Data should read

Oct. 7, 1996   [KR]   Rep. of Korea      96-44451

Signed and Sealed this

Eighth Day of June, 1999

*Attest:*

Q. TODD DICKINSON

*Attesting Officer*    *Acting Commissioner of Patents and Trademarks*